Feb. 23, 1960     E. F. SCHAEFER     2,926,101
METHOD OF TREATING GLASS CONTAINER SURFACES
Filed Nov. 23, 1956     2 Sheets-Sheet 1
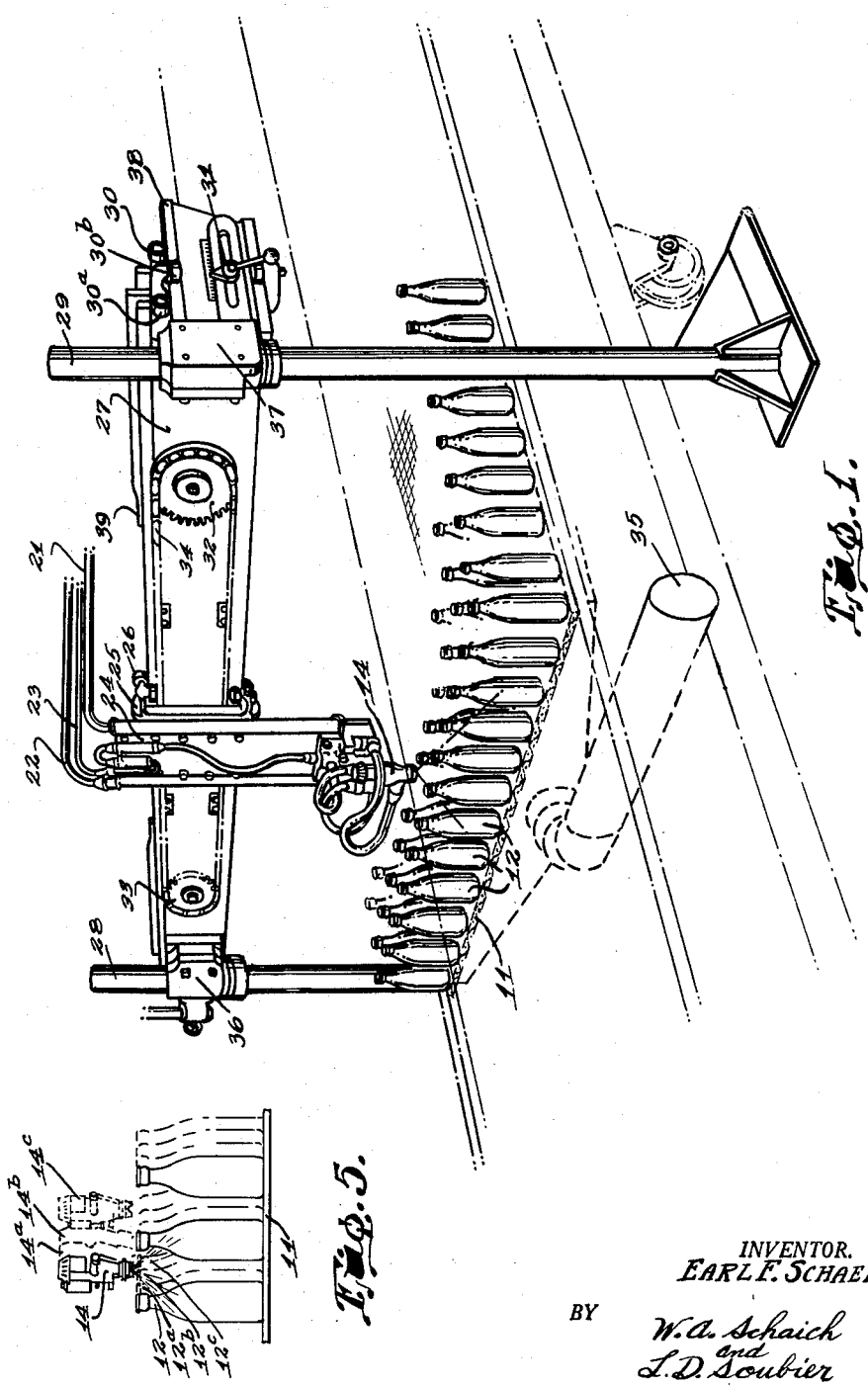
INVENTOR.
EARL F. SCHAEFER
BY W. A. Schaich
and
L. D. Soubier
ATTORNEYS Feb. 23, 1960   E. F. SCHAEFER   2,926,101
METHOD OF TREATING GLASS CONTAINER SURFACES
Filed Nov. 23, 1956
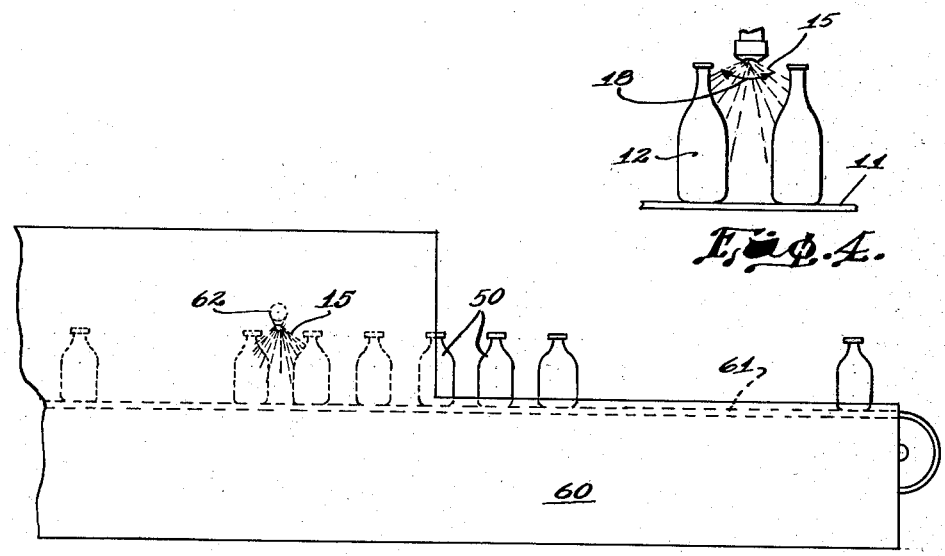
Fig. 4.
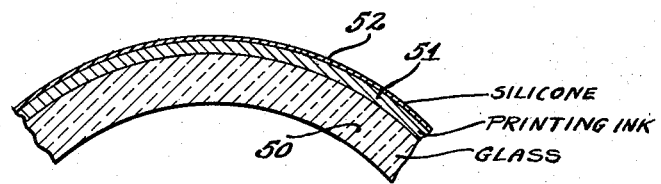
Fig. 2.
Fig. 6.
Fig. 3.
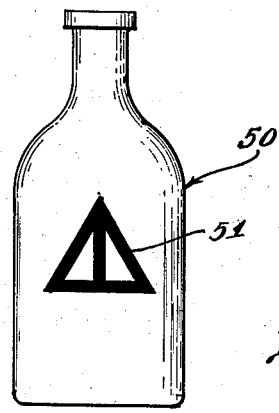
Fig. 7.
INVENTOR
EARL F. SCHAEFER
ATTORNEYS

United States Patent Office 2,926,101
Patented Feb. 23, 1960

2,926,101
METHOD OF TREATING GLASS CONTAINER SURFACES

Earl F. Schaefer, Toledo, Ohio, assignor to Owens-Illinois Glass Company, a corporation of Ohio Application November 23, 1956, Serial No. 624,051

5 Claims. (Cl. 117—45)

The present invention relates to a treatment for glassware and, more specifically, this invention relates to an improved process of applying a surface coating to bare glass containers and to glass containers bearing a decoration or a printed design.

It has long been recognized that various treatments may be given to glass surfaces, and that such treatments may improve the resistance to breakage or scratching. However, the processes used heretofore, where liquid treatment was involved, have utilized so-called gang-type spray system for distributing the treatment or solution on the glass surfaces involved. These gang-type spray systems generally involve a simple manifold, having a plurality of ports extending across their length and continuously emitting the solution of treatment liquid to cause, in effect, a veritable curtain of the treating solution. While this type of arrangement may be satisfactory with inexpensive materials and solutions thereof, it becomes impractical, if not economically prohibitive, in connection with more expensive raw materials such as silicones. Furthermore, the foregoing arrangement is not satisfactory where the treatment is desirably applied in the form of a mist rather than the aforesaid curtain. A mist of a particular treating agent is highly desirable because it allows a more efficient utilization of the particular treating agent and enables a thin and more uniform coating or film to be applied. However, attempts to convert the manifold type arrangement to provide a mist of the desired agent have been largely unsuccessful, principally due to the fact that insufficient coverage of the surfaces of glass containers can be obtained with practical spraying pressures which do not carry the mist down over the entire surfaces of the containers, and, consequently, the mist collects on the uppermost surfaces of the containers.

Another disadvantage of processes employed heretofore is that the treating agent or solution is indiscriminately distributed and, therefore, the insides of containers so treated are coated with the particular agent. Naturally, certain agents or solutions thereof have toxilogical effects and cannot be tolerated on the inside of containers which are ultimately to be utilized as containers for foods or beverages for human consumption. Another disadvantage of conventional arrangements, particularly when used subsequent to an annealing step, is the fact that the annealing apparatus becomes contaminated and fouled with the agent or solution sprayed by the conventional arrangement.

With reference to another aspect of this invention, namely, glassware containing decorations and printed designs on their surfaces, it is usually found that the designs are composed of printing inks which may be applied by any one of numerous methods of applications, such as printing, stenciling, and silk screening. The fixation of the designs is usually accomplished by the application of heat to irreversibly cure the printing ink onto the glass. The temperature level required depends primarily upon the composition of the ink.

One of the most outstanding shortcomings of printing ink formulations for decorating glassware is their lack of durability when subjected to exposure to water and water vapor for prolonged periods, or for shorter periods during cleaning of the glassware. The decorative designs are weakened by such exposure and rendered more susceptible to removal by scratching or abrasive contact with other surfaces. Thus, in compounding printing inks for decoration purposes, it is essential that their resistance to water and abrasion be evaluated prior to their adoption for use.

Accordingly, it is an object of this invention to provide a continuous process for surface treatment of glass containers which is particularly adapted to effect a uniform deposit of a liquid treating agent upon the outer surfaces of containers.

It is also an object of this invention to provide such a process which more efficiently applies a liquid treating agent to glass containers, hence, utilizes a minimum amount of materials.

It is still another object of this invention to provide a method of coating glass containers which may be easily and simply carried out without introducing any of the treating agent or solution inside of the container to be coated.

Another object of this invention is to impart a protective coating over decorative designs on glassware, which coating is firmly bonded to the external surfaces of said designs to markedly improve their resistance to water and abrasion, and, as well, to broaden the possible applications of many of the known ink compositions.

The specific nature of this invention, as well as other objects and advantages thereof, will become apparent to those skilled in the art from the following detailed description, taken in conjunction with the annexed sheet of drawings on which, by way of example only, are illustrated embodiments of this invention.

Referring to the accompanying drawings:

Fig. 1 is a fragmentary perspective view of a typical continuous conveyor arranged for treating glass containers in accordance with the method of this invention.

Fig. 2 is a fragmentary side elevational view of the end of a conventional decorating lehr showing the interior in broken lines.

Fig. 3 is a schematic plan view of two adjacent rows of glass containers on the conveyor of Fig. 1.

Fig. 4 is a schematic side elevation view of two adjacent rows of glass containers on the conveyor of Fig. 1.

Fig. 5 is a side elevation view illustrating relative motion and position between successive rows of glass containers and a mist-emitting head.

Fig. 6 is a fragmentary sectional plan view of a decorated bottle wall with the thickness of the coatings greatly exaggerated.

Fig. 7 is a side elevational view of a decorated bottle.

Basically, this invention comprises bringing containers to a particular temperature, exposing them to a zone of a mist of an aqueous emulsion of a treating material, such as a silicone resin, which zone is spatially confined and is maintained so as to move in a unilateral direction past the surfaces of the containers.

In an illustration of an embodiment of this invention, a continuous traveling conveyor 11 formed of recticulated material is shown in Fig. 1. Glass containers 12 are positioned on the conveyor 11 in upright relationship and in parallel spaced-apart rows.

As the glass containers 12 are continuously advanced on the conveyor 11, the temperature of the surfaces of said containers is brought to within a range of between 100° F. to 400° F. When this satisfactory temperature has been attained, a spray head 14 is passed between adjacent rows of said containers and caused to project a mist of an aqueous emulsion of a treating material, such as a silicone resin, downwardly and outwardly in such a fashion as to contact only the outer surfaces of said containers. As illustrated in Fig. 3, the spray head is desirably moved in a path equi-distantly between the adjacent rows of containers, whereby equal distribution of the mist is insured. The spray head is adapted, as particularly illustrated in Fig. 4, to emit a cone-shaped zone 15 of a mist of the treating material. The apex of the cone is carefully positioned just above the containers so that the cone of mist projects downwardly and outwardly as described above. The included angle 18 (Fig. 4) of the cone-shaped zone should not exceed 120° and, most preferably, is maintained so as to define an included angle of from 45° to 90°. By the term "included angle" is meant that angle, depending from the vertex of the cone, as described by passing a section through the vertex perpendicular to the base. The spatially confined zone which results from the foregoing, in connection with the exhaust feature discussed more fully hereinafter, insures a positive unidirectional flow of the mist about the entire outer surface of the respective containers. The zone may, instead of the cone-shaped configuration, assume the shape of a generally flat inverted V, the cross sectional plane of which is parallel to the path of travel of the containers. The aforesaid generally flat shape is shown in Fig. 3. The cone or flat inverted V configuration may be provided by a single spray head, or may be provided by more than one, as is illustrated in Fig. 3. There, a single head 14 has several orifices adapted to emit the generally flat inverted V shaped zone of mist. The important factor is that the mist be spatially confined and directed downwardly and outwardly as referred to hereinafter.

One particular arrangement for accomplishing the processes of this invention is illustrated in detail in Fig. 1, showing in perspective upright bottles 12 carried on the conveyor 11 and arranged in parallel rows which are perpendicular to the path of advancement provided by the conveyor 11. On each side of the conveyor 11 are positioned vertical support posts 28 and 29. A main cross beam 27 spans the distance between the said support posts and is situated above the advancing rows of bottles. The cross beam 27 bears a transversely movable spray head carriage assembly 24 and 25 and head 14. One end of the cross beam 27 is slidably mounted on vertical post 28 by means of a rotatable clamp 36. The other end of the cross beam is not directly connected to the support post 29, but is carried by roller bearings 30, 30a, and 30b on a short horizontal I beam 38, which is connected to a slidable clamp 37, similar to clamp 36. The I beam 38 is in parallel alignment with the path of advancement of the bottles 12, and allows the one end of the cross beam 27 to be displaced so that the angle of said cross beam with respect to the parallel rows of bottles may be varied, as discussed more fully hereinafter. The spray head carriage assembly 24 and 25 is movable within the extremities of the cross beam 27, and its movement is caused by a chain 34 carried by laterally displaced sprockets 32 and 33, mounted on the cross beam, and driven by suitable means not shown. Flexible conduits 21, 22, and 23 are connected to the spray head 14 and supply same with the aqueous emulsion, atomizing air, and control air, respectively, the latter operating a needle valve which controls spraying and non-spraying sequence of the spray head. The control air to the needle valve, not shown, and effecting termination of spray emission, is activated when roller 26, attached to the spray head carriage assembly 24 and 25, moving across the top surfaces of cross beam 27, contacts the cam projection 39. Angular displacement of the cross beam 27 allows the spray head 14 to advance in the same direction as the advancing rows of bottles at the same uniform rate as the bottles, while simultaneously passing transversely over the path of the bottles. The results of the foregoing are particularly illustrated in Fig. 5, showing the instantaneous position and relationship between the spray head 14c, 14b, 14a, and 14 in relation to bottles 12c, 12b, 12a, and 12. When the spray head 14 reaches the end of its path between two adjacent rows, the spray is terminated by the cam means 26 and 39 activating the air supply 23, and, in turn, closing the needle valve within the spray head assembly 14; while the chain 34 returns the carriage assembly 24 and 25, including the spray head 14, to the other extremity of the advancing rows of bottles in time to repeat the cycle and proceed in spraying operation between the next two adjacent rows of bottles. The angular displacement of the cross beam 27 is adjusted to conform to the speed of advancement of the bottles 12, carried on the conveyor 11. It is also possible to advance the bottles intermittently in such a fashion that they are brought to a standstill, with the spray head 14 positioned over a midpoint between two adjacent rows. With this arrangement, the cross beam can be aligned parallel with the rows of bottles, and the spray head caused to pass between said adjacent rows while they are in the stationary position. Obviously, in this latter type of operation, the mist or spray can be continuously maintained and the zone of mist, or spray, passed over and back, followed by an advancement of the rows to bring the next two adjacent rows into position, and the zone of mist again passed across and back, etc.

An exhaust vent 35, having a generous cross sectional area, is positioned beneath the conveyor 11 in a plane passing vertically through the spray head 14. The exhaust is maintained continuously and serves to provide a uniform and positive unidirectional flow of the mist projected downwardly and outwardly from the spray head 14. This serves to insure complete contact of the entire outer container surface and also serves to prevent the material constituting the mist from being swept by indiscriminate air currents back into the interior of the annealing oven.

The specific apparatus shown in Fig. 1 is described and claimed in the co-pending application of Paul E. Bivens and Earl F. Schaefer, entitled "Improved Apparatus for Applying Surface Coatings to Glassware," S.N. 624,159, filed November 23, 1956, and assigned to the assignee of this application.

In a more specific embodiment of this invention, the discharge end portion of a conventional decorating lehr 60 is shown in Fig. 2, with a continuous traveling conveyor 61, formed of reticulated material, upon which the decorated glass containers are finished. The decorated products consist of glass bottles 50 or other similar glass articles, which are carried upon the continuously moving conveyor 61 through the desired temperature zones of the lehr 60 at a controlled rate of speed, in the decoration-fixing operation. In Fig. 2, the glass bottles 50 are shown spaced-apart within the lehr 60 in upright positions upon the conveyor 61.

The external surfaces of the bottles 50 are decorated with printing ink designs 51, one such bottle being shown in Fig. 7. The decorated bottles 50 are carried through the lehr 60 for the required length of time at the proper temperature levels to properly bake the designs 51 onto the glass. The designs 51 may be applied hot or cold prior to the baking operation, depending upon the type of printing ink composition employed and the method of application selected. As is customary in the expedient manufacture of decorated glass bottles, the designs 51, after their proper application in unfixed form, are permanently affixed to the glass within the decorating lehr 60 or a similar baking oven, usually by heating the bottles 50 to a temperature in excess of 450° F.

The majority of printing inks used for decorative purposes on glassware contain silicone resins to obtain the most desirable properties of clearly defined and firmly bonded decorative patterns. In the present invention, the use of printing inks containing silicone resins is preferable, although satisfactory results have been obtained with ordinary printing inks which do not contain silicone resins.

In this invention, the decorated glass bottles 50 are then coated with a protective film of silicone material while passing through the lower temperature zone of the lehr tunnel at its discharge end. In Fig. 2, the protective film or coating of silicone material is provided by a spray head 62, positioned just above the tops of the decorated glass containers 50, and adapted to emit or spray a confined zone 15 of a mist of the silicone. The silicone material consists of a synthetic silicone resin, which forms a thin film 52 (Fig. 6) over the baked printing ink designs 51 and the surrounding glass surfaces of the bottles 50. Preferably, the silicone material utilized is in the form of an aqueous emulsion of a polysiloxane polymer. The volatile aromatic hydrocarbon solutions of these polysiloxane polymers are undesirable in view of the fact that economical operation would require extensive solvent recovery systems. Furthermore, the use of such organic solvent solutions involves hazards, in view of the fact that such volatile organic solvents are quite flammable. Thus, it has been found that an easy and practical method of application is to deposit the organic polysiloxane polymer in the form of a water emulsion by spraying it in the form of a fine mist when the surfaces of the glass containers have been brought to the proper temperatures. Other treating agents which have been applied by the method of this invention are the commercially-available polyethylene waxes. These are similarly applied in the form of an aqueous emulsion containing about 0.5 percent by weight of the polyethylene wax for the optimum degree of surface improvement. Preferred temperatures for application of the mist of aqueous emulsion of the polysiloxane polymer are between 100° F. and 400° F. This temperature range is effected just prior to the application of the silicone material, and follows a heating step which is desirably carried out, especially in the case of decorated bottles, at a temperature of 450° F. or above, as referred to hereinbefore. The higher temperature of 450° F. serves to completely cure the printing ink constituting the decoration onto the surface of the glass bottles. The concentration of the polysiloxane polymer in the aqueous emulsion is desirably kept within the range of from 0.02 to 2.0 weight percent calculated on the basis of the total weight of emulsion. Less than 0.02 weight percent of the polysiloxane polymer is undesirable due to the fact that insufficient improvement in surface characteristics are imparted. A deposit of an emulsion containing more than 2.0 weight percent of the polysiloxane polymer is undesirable because such a deposit will be cured only with difficulty. True emulsion of the polysiloxane polymer in aqueous solutions can be effected by the use of any of the conventional emulsifiers, either of the ionic or non-ionic type. Sulfonated castor oil is an example of an ionic emulsifier which has been found to satisfactorily deposit a suitable polysiloxane film on the surface of bottles by the method of this invention.

The silicone coating, or film 52, is most effective when used with a printing ink incorporating a silicone resin in its composition, because of the chemical bond which is established between the silicones of the ink and the coating. The temperature range of 300° F. to 450° F., in which the spray 15 is applied, furnishes a very suitable condition for the establishment of silicone bonding reactions. The silicone coating applied at the time of baking of the ink thus chemically bonds directly to the silicone of the ink itself when such decorating inks are employed, creating a more water-proof and abrasion-resistant coating than is obtained without the finishing treatment of the silicone coating. The coating can also be employed beneficially with inks which do not contain silicone as an ingredient, as such coating becomes firmly bonded to the constituents of ordinary printing inks, primarily due to the heat of baking.

It is apparent that many variations of this process will be obvious to those skilled in the art; however, it is intended to include within the scope of this application all such obvious equivalents being not limited to the particular proportions, procedures, materials, etc., described above.

This application is a continuation in part of my application, Serial No. 511,057, filed on May 25, 1955.

I claim:

1. A method of producing decorated glass containers having improved surface characteristics which comprises decorating said glass containers with a decorating material which is hardenable at elevated temperatures, advancing said decorated glass containers in parallel rows, which are disposed perpendicular to the path of advancement, establishing a singular, spatially confined cone-shaped zone including a mist of a surface treating agent capable of forming a protective coating, positioning the apex of said cone just above said containers so as to project mist downwardly and outwardly through an included angle less than 120°, moving said cone between successive rows of said containers in a path equi-distant between said rows, whereby the outer surfaces only of said containers are exposed to a concentrated mist of said surface treating agent and coated therewith without substantial introduction of mist within said containers, and inducing exhaust at a point below said containers, whereby a positive unidirectional flow of said mist about the entire outer surfaces of said containers is maintained and undeposited mist is removed.

2. A method of producing decorated glass containers having improved surface characteristics which comprises decorating said glass containers with a decorating material which is hardenable at elevated temperatures, advancing said decorated glass containers in parallel rows, which are disposed perpendicular to the path of advancement, through a heating and cooling cycle in which the heating portion of said cycle is maintained at a temperature above 450° F. to harden said decorating material and bond the decorating material thereto, adjusting the cooling portion of said cycle to cool the surfaces of said glass containers to a temperature in the range of about 400° F. to about 100° F., establishing a singular, spatially confined cone-shaped zone including a mist of a surface treating agent capable of forming a protective coating, positioning the apex of said cone just above said containers so as to project mist downwardly and outwardly through an included angle less than 120° and in excess of 45°, moving said cone between successive rows of said containers in a path equi-distant between said rows, whereby the outer surfaces only of said containers are exposed to a concentrated mist of said surface treating agent and coated therewith without substantial introduction of mist within said containers, and inducing exhaust at a point below said containers, whereby a positive unidirectional flow of said mist about the entire outer surfaces of said containers is maintained and undeposited mist is removed.

3. A continuous process for the production of glass containers having improved surface characteristics comprising conveying upright glass containers in successive spaced-apart rows, arranged in transverse relationship with respect to the direction of conveyance, through a heating and cooling cycle, adjusting the cooling portion of said cycle to cool the surfaces of said glass containers to a temperature of from about 100° F. to about 400° F., moving a unitary source of cone-shaped downwardly projecting mist transversely across the path of said rows of said containers, the cone of said mist having an included angle of less than 120°, said mist comprising a surface treating agent capable of forming a protective coating, while at the same time advancing said source in the direction of travel of said containers to provide a relatively confined cone-shaped zone of said mist moving between two adjacent rows of said containers, whereby mist is deposited uniformly on the outer surfaces of the containers only, terminating mist emission at the end of a row of containers, returning the source to its original position for a repeat cycle, and inducing exhaust at a point below said containers, whereby a positive unidirectional flow of said mist is maintained and undeposited mist is removed.

4. A continuous process for the production of glass containers having improved surface characteristics which comprises advancing upright glass containers in parallel rows, which are disposed perpendicular to the path of advancement, establishing a singular, spatially confined cone-shaped zone including a mist of a surface treating agent capable of forming a protective coating said cone-shaped zone having an apex angle of less than 120°, positioning the apex of said downwardly flaring cone just above said containers so as to project mist downwardly and outwardly, moving said cone between successive rows of said containers in a path equidistant between said rows, whereby the outer surfaces of said containers are exposed to a concentrated mist of said surface treating agent and uniformly coated therewith, and inducing exhaust at a point below said containers whereby a positive unidirectional flow of undeposited mist about said containers is maintained.

5. A continuous process for the production of glass containers having improved surface characteristics which comprises advancing upright glass containers in parallel rows, which are disposed perpendicular to the path of advancement, establishing a singular, spatially confined cone-shaped zone of a mist of a surface treating agent capable of forming a protective coating, positioning the apex of said cone just above said containers so as to project mist downwardly and outwardly through an included angle of less than 120°, moving said cone between successive rows of said containers in a path equidistant between said rows, while controlling the existence of said zone, whereby the outer surfaces only of said containers are exposed to a concentrated mist of said surface treating agent and coated therewith without substantial introduction of mist within said containers, and inducing exhaust at a point below said containers whereby a positive unidirectional flow of said mist about the entire outer surfaces of said containers is maintained, and undeposited mist is removed.

References Cited in the file of this patent
UNITED STATES PATENTS

| | | |
|---|---|---|
| 822,578 | Burdick | June 5, 1906 |
| 2,023,175 | Kniep | Dec. 3, 1935 |
| 2,293,881 | Bailey | Aug. 25, 1942 |
| 2,369,737 | Jackson et al. | Feb. 20, 1945 |
| 2,428,357 | Cohen et al. | Oct. 7, 1947 |
| 2,588,828 | Greiner | Mar. 11, 1952 |
| 2,630,656 | Kramer et al. | Mar. 10, 1953 |
| 2,726,172 | Bennett et al. | Dec. 6, 1955 |
| 2,730,841 | Seabright | Jan. 17, 1956 |